United States Patent
Breitfuss et al.

(10) Patent No.: US 7,652,556 B2
(45) Date of Patent: Jan. 26, 2010

(54) METHOD FOR ACTIVATING A COMMUNICATION MODE OF A PEER COMMUNICATION UNIT

(75) Inventors: Klemens Breitfuss, Voitsberg (AT); Holger Kunkat, Graz (AT)

(73) Assignee: NXP B.V., Eindhoven (NL)

( * ) Notice: Subject to any disclaimer, the term of this patent is extended or adjusted under 35 U.S.C. 154(b) by 331 days.

(21) Appl. No.: 10/541,653

(22) PCT Filed: Dec. 22, 2003

(86) PCT No.: PCT/IB03/06275

§ 371 (c)(1),
(2), (4) Date: Jul. 7, 2005

(87) PCT Pub. No.: WO2004/063971

PCT Pub. Date: Jul. 29, 2004

(65) Prior Publication Data

US 2006/0119470 A1 Jun. 8, 2006

(30) Foreign Application Priority Data

Jan. 8, 2003 (EP) .................................. 03100022

(51) Int. Cl.
*H04Q 5/22* (2006.01)
(52) U.S. Cl. .................. 340/10.1; 340/572.1; 340/10.42
(58) Field of Classification Search .............. 340/10.42, 340/572.1, 10.1, 10.3, 10.33, 10.34
See application file for complete search history.

(56) References Cited

U.S. PATENT DOCUMENTS

| 5,929,779 | A | * | 7/1999 | MacLellan et al. | .......... 340/10.2 |
| 6,963,270 | B1 | * | 11/2005 | Gallagher et al. | .......... 340/10.2 |
| 2002/0024423 | A1 | * | 2/2002 | Kline | .................... 340/310.01 |

FOREIGN PATENT DOCUMENTS

| EP | 0 513 507 | | 11/1992 |
| EP | 0513507 | A1 * | 8/2000 |
| WO | WO 02/41650 | | 5/2002 |

\* cited by examiner

*Primary Examiner*—Brian A Zimmerman
*Assistant Examiner*—Yong Hang Jiang

(57) ABSTRACT

When activating a desired communication mode of an ID communication partner device (2) from a group of possible communication modes, which group comprises at least a TTF mode and an RTF mode, the ID communication partner device (2) and at least one other ID communication partner device (4) are brought into a communication connection, wherein a carrier signal (CS) is output by the at least one other ID communication partner device (4), which carrier signal (CS) is received by the ID communication partner device (2), and wherein the carrier signal (CS) is repeatedly designated by at least one mode activation signal (AS) by means of the at least one other ID communication partner device (4), and wherein the presence of the mode activation signal (AS) is recognized by the ID communication partner device (2), giving a recognition result signal (RRS), and wherein, as a function of the recognition result signal (RRS), the desired communication mode of the ID communication partner device (2) is activated.

15 Claims, 2 Drawing Sheets

METHOD FOR ACTIVATING A COMMUNICATION MODE OF A PEER COMMUNICATION UNIT

The invention relates to a method for activating a desired communication mode of an ID communication partner device from a group of possible communication modes.

The invention furthermore relates to an integrated circuit for an ID communication partner device, which integrated circuit comprises activation means for activating a desired communication mode of the ID communication partner device from a group of possible communication modes.

In a sufficiently known communication system, having ID communication partner devices, that is used publicly in a number of variant embodiments and is designed as a Reader Talks First (RTF) system, some of the ID communication partner devices are each formed by a transponder or ID tag and other ID communication partner devices are each formed by a communication station. The abbreviation ID in this case stands for the word "identification". The transponders can be brought into communication connection with a communication station. When setting up such a communication connection, in an RTF system of this type the communication station always becomes active first. An interrogation signal will be output by the communication station, which interrogation signal is received by those ID tags that are within a communication range of the communication station, whereupon these ID tags each output a response signal to the communication station. Such a response signal may contain, for example, a characteristic signal, which characteristic signal in each case signifies an ID tag and as a result is used by the communication station to distinguish the ID tags from one another. By means of a specific communication protocol, such a communication station is able to unambiguously recognize response signals sent out by various ID tags, in the course of an inventorying process.

In a Tag Talks First (TTF) system which is likewise used publicly and has been known for a long time, it is possible for an ID tag to become active on its own, without having to be interrogated for this purpose by a communication station. Such an ID tag itself outputs an identification signal, which identification signal is received by a suitable communication station, after which further communication between the two ID communication partner devices is carried out in accordance with a defined communication protocol.

In an RTF system, an ID tag that is designed for a TTF system or that has a TTF mode causes a disruption in communication in the RTF system and cannot therefore be used in an RTF system. For certain applications, however, the use of such ID tags for the TTF system in an RTF system is very advantageous and desirable.

The document WO 02/41650 A1 discloses an ID tag which can be used in both systems. In the case of such a known ID tag, a changeover between two modes, that is to say between two communication modes, can be carried out, to be specific between a mode which is required for use in an RTF system and a mode which is required for use in a TTF system. Such a changeover is in this case carried out by activation means such that, in storage means of the ID tag, a bit value can be set or erased by means of a command transmitted by a communication station, wherein the communication mode is adjusted depending on the set bit value. A disadvantage of the known method and the known ID tag is that the ID tag must be programmed in advance for either the one application or the other application, that is to say the bit value has to be set by means of a command, and this takes place, for example, as early as when the ID tag is produced or when the ID tag is initialized. An ID tag that is programmed for use in one system, that is to say for example an ID tag that is programmed for a TTF system, cannot function in another system, that is to say for example in an RTF system, or will cause a disruption in such a system, and this is disadvantageous. Where appropriate, reprogramming may be effected; however, this requires a specific communication station which is suitable for this purpose and which must service a suitable communication protocol. This is a condition that is often not met and can be laborious and expensive, which is disadvantageous.

It is an object of the invention to eliminate the abovementioned disadvantages and to produce an improved method and an improved integrated circuit for an ID communication partner device designed as a communication station, and an improved ID communication partner device designed as a communication station, and an improved integrated circuit for an ID communication partner device designed as a data carrier, and an improved ID communication partner device designed as a data carrier.

To achieve the abovementioned object, a method according to the invention is provided with features according to the invention, so that a method according to the invention can be characterized as follows, namely:

A method for activating a desired communication mode of an ID communication partner device from a group of possible communication modes, which group comprises at least a first mode and a second mode, wherein the ID communication partner device and at least one other ID communication partner device are brought into a communication connection and wherein a carrier signal is output by the at least one other ID communication partner device, which carrier signal is received by the ID communication partner device, and wherein the carrier signal is repeatedly designated by at least one mode activation signal by means of the at least one other ID communication partner device, and wherein the presence of the mode activation signal is recognized by the ID communication partner device, giving a recognition result signal, and wherein, as a function of the recognition result signal, the desired communication mode of the ID communication partner device is activated.

To achieve the abovementioned object, an integrated circuit for an ID communication partner device designed as a communication station, according to the invention, is also provided with features according to the invention, so that such an integrated circuit according to the invention can be characterized as follows, namely:

Integrated circuit for an ID communication partner device designed as a communication station, which integrated circuit comprises the following means:

Output means for outputting a carrier signal, which carrier signal can be received by an ID communication partner device, and generation means for generating at least one mode activation signal, and designation means, by means of which the carrier signal can be repeatedly designated by the at least one mode activation signal.

To achieve the abovementioned object, an ID communication partner device designed as a communication station, according to the invention, is also provided with features according to the invention, so that such an ID communication partner device according to the invention can be characterized as follows, namely:

ID communication partner device, which is designed as a communication station and which is provided with an integrated circuit for an ID communication partner device designed as a communication station, according to the invention.

To achieve the abovementioned object, an integrated circuit for an ID communication partner device designed as a data carrier, according to the invention, is also provided with features according to the invention, so that such an integrated circuit according to the invention can be characterized as follows, namely:

Integrated circuit for an ID communication partner device designed as a data carrier, which integrated circuit comprises the following means:

Activation means for activating a desired communication mode of the ID communication partner device from a group of possible communication modes and storage means for storing mode control data of the group of possible communication modes, which group comprises at least a first mode and a second mode, and reception means for receiving a carrier signal that is output by an ID communication partner device and is designated with a mode activation signal, and recognition means for recognizing the presence of the at least one mode activation signal, by means of which recognition means a recognition result signal can be generated, as a function of which recognition result signal the activation of the desired communication mode of the ID communication partner device can be activated by the activation means.

To achieve the abovementioned object, an ID communication partner device designed as a data carrier, according to the invention, is also provided with features according to the invention, so that such an ID communication partner device according to the invention can be characterized as follows, namely:

ID communication partner device, which is designed as a data carrier and which is provided with an integrated circuit for an ID communication partner device designed as a data carrier, according to the invention.

By providing the features according to the invention, the situation is advantageously and simply achieved that, when using ID communication partner devices designed according to the invention, the ID communication partner devices designed as data carriers can automatically recognize which communication mode is to be activated, so that the relevant data carrier can itself start communication where appropriate, without having to await an interrogation, and such a data carrier can be used without disruption even in communication systems in which an ID communication partner device designed as a communication station, in the capacity of a central communication control unit, determines the communication mode, wherein all data carriers located in the communication range of the communication station may communicate with the communication station when interrogated by the latter.

By providing certain measures in accordance with an embodiment of the invention, the advantage is obtained that the ID communication partner device designed as a data carrier can be used in known and widespread communication systems.

By providing certain measures in accordance with an embodiment of the invention, the advantage is obtained that the mode activation signal can be generated in a relatively simple manner.

By providing certain measures in accordance with an embodiment of the invention, the situation is advantageously obtained that a continuously designated carrier signal can be used in the communication system and the continuously designated carrier signal can be demodulated in the communication stations, which are in each case designed as data carriers, by means of a simple demodulator.

By providing certain measures in accordance with an embodiment of the invention, the situation is advantageously obtained that a continuously designated carrier signal can be used in the communication system and the continuously designated carrier signal can be detected in those communication partner devices, which are designed as data carriers, by means of a simple filter.

In the method according to the invention or in an ID communication partner device according to the invention that is designed as a communication station, the designation of the carrier signal may take place continuously. However, it has proven to be particularly advantageous when certain measures in accordance with an embodiment of the invention are provided. As a result, the situation is obtained that relatively simple demodulation methods can be used in the recognition of the mode activation signal in the communication partner devices which are in each case designed as data carriers, which demodulation methods may otherwise have a disruptive effect during recognition of the transmitted signals in the event of continuous designation of the carrier signal and simultaneous use of the carrier signal to transmit command signals.

In an ID communication partner device according to the invention that is designed as a communication station, for designation of the carrier signal a designation start point and designation duration can be set or predefined manually by an operator. However, it has proven to be particularly advantageous when certain measures in accordance with an embodiment of the invention are provided. As a result, the situation is obtained that, in an ID communication partner device designed as a communication station, the designation start point and the designation duration can be determined automatically for designation of the carrier signal.

The abovementioned aspects and other aspects of the invention emerge from the example of an embodiment which is described below, and are explained on the basis of said example of an embodiment.

The invention will be further described with reference to an example of an embodiment shown in the drawings to which, however, the invention is not restricted.

Figure 1:
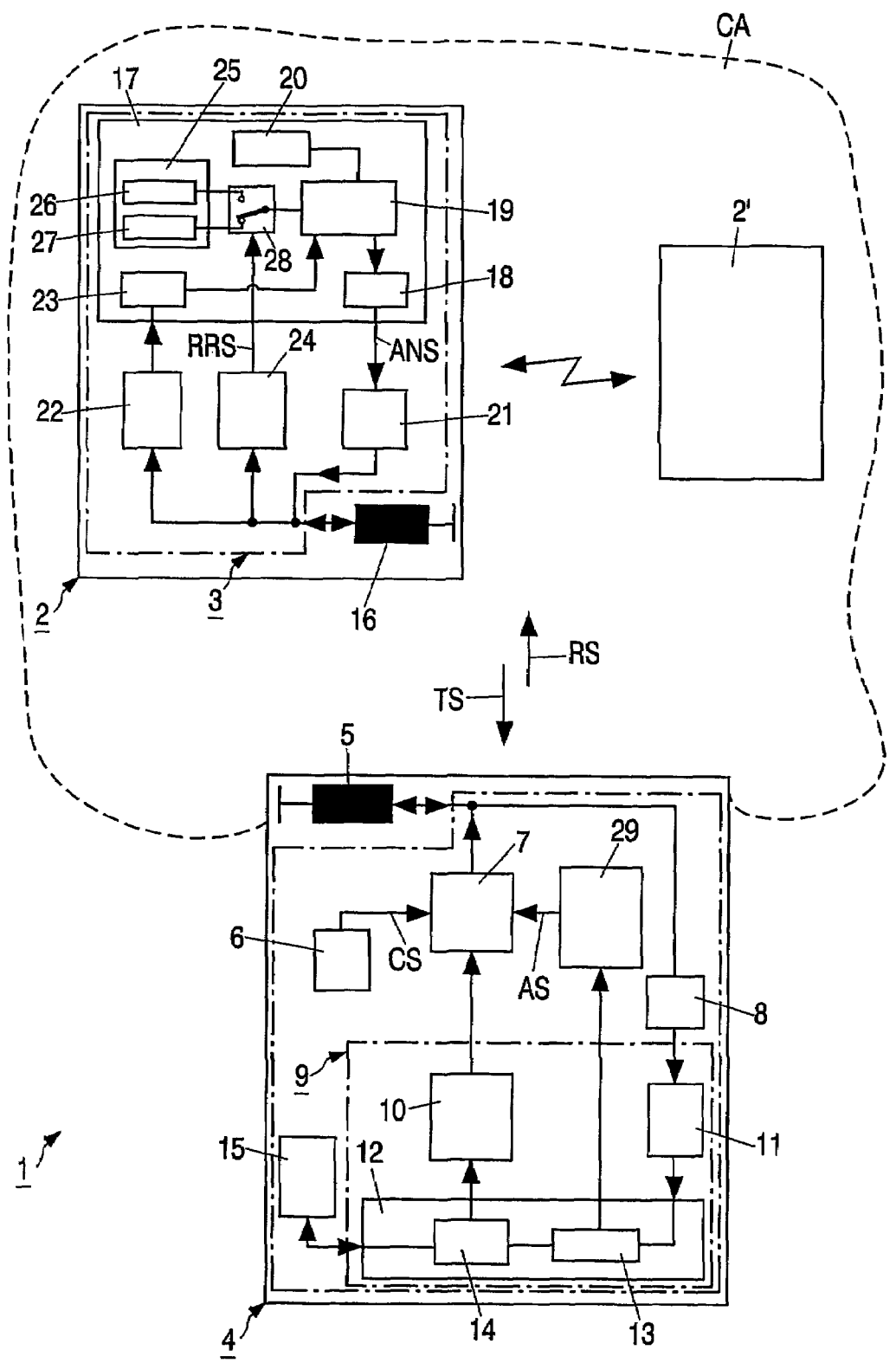
FIG. 1 shows schematically, in the form of a block diagram, those parts of ID communication partner devices according to the invention which are essential in the present context, which ID communication partner devices each contain an integrated circuit according to the invention.

FIG. 1 shows an RFID communication system 1 with RFID communication partner devices in a communication range CA, which communication range CA is illustrated by a dashed line. Here, one RFID communication partner device is designed as a data carrier 2, another RFID communication partner device is designed as a communication station 4 and a further RFID communication partner device is designed as a data carrier 2', wherein the data carrier 2 and the communication station 4 are shown in more detail.

The communication station 4, which may likewise be referred to as the reader station 4, is designed for contactless communication with the two data carriers 2 and 2'.

The reader station 4 has transmission means 5, which form both sending means and receiving means, define the communication range CA during sending, are designed to send a reader signal RS at a frequency of 13.56 MHz and are designed to receive a data carrier signal TS from the two data carriers 2 and 2'. Such transmission means 5 have been known for a long time, for example from the document U.S. Pat. No. 5,537,105 A1, the disclosure of which is hereby incorporated by way of reference.

The reader station 4 furthermore has carrier signal generation means 6, modulation means 7 and demodulation means 8 for purposes which are likewise known. The reader station 4 furthermore has processing means 9 that are formed by a microprocessor, which microprocessor forms the following means: command signal generation means 10 for generating command signals and for outputting the command signals to the modulation means 7, reception signal processing means 11 which are designed to process a demodulated reception signal output by the demodulation means 8, and also sequence control means 12 for controlling the command signal generation means 10, the reception signal processing means 11 and other means that are not shown.

The sequence control means 12 comprise: communication status recognition means 13, which are designed to recognize a communication status, and communication mode changeover means 14, which in this case are designed for changeover between two communication modes.

The reader station 4 furthermore has storage means 15, which are connected to the processing means 9 and the sequence control means 12 and which are designed to store mode control data of the two communication modes and to store received information.

The data carriers 2 and 2' have transmission means 16 for sending the data carrier signal TS and for receiving the reader signal RS output by the reader station 4. The data carriers 2 and 2' are formed by what are known as passive data carriers and have clock signal generation means and operating voltage generation means, which are not shown in any greater detail, with which clock signal generation means or operating voltage generation means a clock signal or the operating voltage for operating the data carriers is derived from the signals output by the reader station 4, for example from the reader signal RS. The data carriers 2 and 2' are designed to send response information ANS and other information, during which sending an unmodulated carrier signal output by the reader station 4 is modulated using a subcarrier signal in accordance with a load modulation depending on the response information. For this purpose, the data carrier 2 or 2' has an integrated circuit 3, which integrated circuit 3 has processing means 17 that are formed inter alia by a microcomputer, which processing means 17 output the response information ANS via modulation means 21 to the transmission means 16, with the aid of command/response generation means 18, sequence control means 19 and data carrier storage means 20 that are contained in said processing means 17.

Furthermore, the integrated circuit 3 has command signal demodulation means 22, which are designed to demodulate the reader signal RS that has been received by the transmission means 16 and modulated in accordance with command signals. The processing means 17 furthermore comprise command signal recognition means 23, which are designed to recognize the command signals and to output these command signals to the sequence control means 19. Such command/response generation means 18, sequence control means 19, data carrier storage means 20, modulation means 21, command signal demodulation means 22 and command signal recognition means 23 are known, for example, from the European patent application having the application number EP 02 100 399.1 (PHAT020020 EP-P), which application is claimed as priority in an international application with the application number IB03/01440, the disclosure of which is incorporated herein by way of reference.

The integrated circuit 3 furthermore has RTF/TTF activation signal recognition means 24, which are designed to recognize a reader signal RS designated or labeled with an RTF/TTF activation signal, and this is described in greater detail hereinbelow.

The processing means 17 furthermore have control data storage means 25 for storing mode control data of the two communication modes, and activation means 28, wherein a storage block 26 for the control data of a TTF mode and a storage block 27 for the control data of an RTF mode are stored in the control data storage means 25. The control data of the TTF and RTF modes are designed here as software code sections, and the control data storage means 25 are designed as a nonvolatile memory ROM. It may be mentioned that the control data storage means 25 may be designed as an EPROM. It may also be mentioned that the control data of the TTF and RTF modes may likewise be formed by a hardwired logic circuit. More details regarding the RTF/TTF activation signal recognition means 24, control data storage means 25 and activation means 28 are given hereinbelow.

Using an example of an embodiment and FIG. 2, the functioning of the two data carriers 2 and 2' according to the invention and of the reader station 4 according to the invention is explained in more detail below.

In one very common application, the RTF mode is initially set in the reader station 4 by means of the communication mode changeover means 14, and a large number of data carriers (not shown in any more detail), with which an RTF mode can be carried out, are brought into communication connection with the reader station 4, by these data carriers being brought into the communication range CA of the reader station 4. These data carriers may for example form electronic tickets for an underground railway system, which tickets are brought into the communication range CA of the reader station 4 prior to or at the start of the journey, in order to pay the price of the journey. Before reading of data contained in each of these data carriers and/or writing of data to each of these data carriers can be carried out, what is known as inventorying of at least one data carrier must be carried out by the reader station 4 that is contactlessly communicating with said data carriers. In the course of such inventorying, for each data carrier identification data ID that is significant for the relevant data carrier is transmitted from the relevant data carrier to the reader station 4 and stored in the reader station 4, so that in the reader station 4 the identification data ID of all data carriers that are in communication connection with the reader station 4 is known, as a result of which it is possible for the reader station 4 to use the identification data ID that signify the data carriers to enter into communication connection with each data carrier in a targeted and unmistakable manner, in order for example to read useful data from the relevant data carrier or to store useful data in the relevant data carrier. It may be mentioned that identification data ID does not have to be determined for all data carriers that can be brought into communication connection with the reader station 4, but rather it is enough to know the identification data ID of a data carrier responding first.

In accordance with the application example, the data carrier 2 and the data carrier 2' have what is known as a multitag functionality or the two data carriers 2 and 2' are each designed as a multitag card which has a large number of authorizations, for example authorizations to access an underground railway system or a parking lot, etc. A user or proprietor of the data carrier 2 and another proprietor of the data carrier 2' then advantageously have the possibility, in a very simple manner, to exchange such access authorizations or to transmit such access authorizations between the two data carriers 2 and 2'. For example, a daily pass for an underground railway system or the authorization to use an underground railway system can be passed from one user to another user without the multitag card, which still contains a large number of further authorizations, having to be handed over.

Such a method and a communication sequence in relation thereto between the RFID communication partner devices, that is to say the data carriers 2 and 2' and the reader station 4, is described below on the basis of FIG. 2. FIG. 2 shows time sequences of communication signals both of the reader station 4 and of the two data carriers 2 and 2', wherein the reader signal of the reader station 4 is denoted RS, the data carrier signal of the data carrier 2 is denoted TS1 and the data carrier signal of the data carrier 2' is denoted TS2.

It is assumed that, at the beginning of the communication sequence, only the data carrier 2 is in the communication range CA of the reader station 4. The reader station 4 is initially set to the RTF mode and outputs, from a time t1 to a time t2, an inventorying command IGCO as reader signal RS, which inventorying command IGCO is generated by the command signal generation means 10 and output to the modulation means 7. Said inventorying command IGCO is received and recognized by the data carrier 2. Since there is still no RTF/TTF activation signal, the RTF/TTF activation signal recognition means 24 of the data carrier 2 output a recognition result signal RRS to the activation means 28 such that the RTF mode is activated. In accordance with the RTF mode of the data carrier 2, the data carrier signal TS1 along with a response signal ANS1 is output by this data carrier 2 from a time t3 to a time t4, and is received by the reader station 4, wherein the response signal ANS1 is in this case formed by an identification number or serial number, which serial number is stored in the data carrier storage means 20. Thereafter, the reader station 4 outputs, from a time t5 to a time t6, a selection command SEL-1, which selection command SEL-1 is received by the data carrier 2 and is acknowledged by an acknowledgement signal ACK-1. Following the acknowledgement signal ACK-1, the reader station 4 outputs a deselection command DSEL-1, which deselection command DSEL-1 is received by the data carrier 2 and is in turn acknowledged by the latter by means of an acknowledgement signal ACK1. The communication by the reader station 4 is now terminated and a communication status to this effect is recognized by the communication status recognition means 13 of the reader station 4. Subsequently, said communication status recognition means 13 initiate changeover of the communication mode of the reader station 4, by the communication mode changeover means 14, to the TTF mode, in which TTF mode the reader station 4 no longer has to start communication since a suitable data carrier can also start such a communication by itself. At the same time, the communication status recognition means 13 initiate generation of an RTF/TTF activation signal AS by generation means 29 for generating such an RTF/TTF activation signal, which generation means 29 are connected to the communication status recognition means 13, and outputting of said RTF/TTF activation signal AS to the modulation means 7. In the modulation means 7, from a time t13, the carrier signal CS is continually designated with the RTF/TTF activation signal AS and output via the transmission means 5, precisely as the reader signal RS with the RTF/TTF activation signal. The RTF/TTF activation signal is in the present case formed by a sinusoidal signal, the frequency of which is selected as an integer multiple of the subcarrier frequency used in the load modulation. It may be mentioned that the frequency of the sinusoidal signal may likewise be selected to be substantially lower than the frequency of the subcarrier signal, for example a quarter or a sixth.

It may furthermore be mentioned that the RTF/TTF activation signal may be formed by another signal form, for example by a triangular form or rectangular form or a sawtooth form. It is important that when, as in the present case, the carrier signal CS is simultaneously used to transmit command signals, the frequency spectra of such command signals and of the RTF/TTF activation signal AS do not overlap one another, because such overlapping would lead to disruptions in the recognition of the transmitted signals in the RFID communication partner devices receiving these signals.

In accordance with the application example, the data carrier 2' comes into the communication range CA of the reader station 4 after the time t13 and before a time t14. The RTF/TTF activation signal recognition means 24 of the data carrier 2' recognize, immediately thereafter, that a reader signal RS designated with an RTF/TTF activation signal AS is present and subsequently initiate the bringing of the data carrier 2' into the TTF mode, by outputting the recognition result signal RRS to the activation means 28. In the present case, the RTF/TTF activation signal recognition means 24 are formed by a simple demodulator, which demodulator is tuned to the frequency of the RTF/TTF activation signal AS, wherein the demodulation is carried out by means of correlation. It may be mentioned that the RTF/TTF activation signal recognition means 24 may likewise be formed by a simple filter if the frequency of the RTF/TTF activation signal AS is selected to be lower than the frequency of the subcarrier signal.

The data carrier 2' can then itself start communication with the other RFID communication partner devices or start an inventorying process. In the present case, an inventorying process is started and carried out in accordance with a time slot method, wherein the data carrier 2' outputs an enquiry command or inventorying command IGCO2 from the time t14 to a time t15, which inventorying command IGCO2 is received by the reader station 4 and the data carrier 2. In this inventorying process, in each case a response signal is generated and output by the two receiving RFID communication partner devices, wherein the data carrier 2 outputs a response signal ANS1 from a time t16 to a time t17 and the reader station 4 outputs a response signal ANS0 from a time t18 to a time t19. It may be mentioned that a different inventorying process may likewise be carried out, for example a process known from the European patent application having the application number EP 02 102 343.7 (PHAT020058 EP-P), which application is claimed as priority in an international application with the application number IB03/03956, the disclosure of which is hereby incorporated by way of reference.

The two response signals ANS1 and ANS0 are in the present case formed by identification signals and are received and evaluated by the data carrier 2'. Subsequently, the data carrier 2' outputs a selection command SEL-1 from a time t20 to a time t21, as a result of which the data carrier 2' can carry out a further communication sequence with the data carrier 2. In such a further communication sequence, for example, useful data can be exchanged between the data carriers 2 and 2', which useful data in the present case is formed by the authorization data.

In accordance with a further example of an embodiment of the invention, the communication status recognition means 13 may be omitted from a reader station. In this case, such a reader station can then be connected to a host computer, wherein a changeover of the communication mode of such a reader station and/or the activation of the designation of the carrier signal can be initiated by an administrator using the host computer. Likewise, such a reader station may be designed so as continually to operate in a TTF communication mode and to output a designated carrier signal.

It may be mentioned that such a further communication sequence may include the reader station 4, for example in order to be able to use the reader station 4 to carry out security enquiries, so that only data allowed according to an authorization can be exchanged between the data carriers 2 and 2'.

It may be mentioned that separate carrier signals can be used for the RTF/TTF activation signal AS and for the command signals.

It may also be mentioned that the designation of the carrier signal with the RTF/TTF activation signal AS can be carried out at predefined time intervals, that is to say that a designation with defined RTF/TTF activation signal sequences takes place, which RTF/TTF activation signal sequences repeat. Such an RTF/TTF activation signal sequence therefore has to be selected such that there is no possibility of confusion with a command signal. A time period between two successive RTF/TTF activation signal sequences should be at least as long as a command signal.

It may furthermore be mentioned that the reader station 4 may likewise be formed by a data carrier 2, wherein such a data carrier 2 has the same means for communication with other data carriers as such a reader station 4.

Using the measures according to the invention, not only is it possible for an automatic recognition of what is known as an RTF mode and what is known as a TTF mode and a subsequent automatic activation of the respectively desired mode in an ID communication partner device designed as a data carrier (transponder) to be carried out, but also it is possible for other types of mode recognition and mode activation to be carried out, for example a recognition of what is known as a short-range mode and what is known as a long-range mode and subsequently an activation of one of these two modes. A recognition of a time-divisional mode and a frequency-divisional mode and a code-divisional mode and a subsequent activation of one of these three modes is also possible.

As described above, the carrier signal CS is repeatedly designated by the mode activation signal AS, wherein this designation can take place such that it is continually repeated or such that it is repeated only at time intervals, wherein the time intervals may be the same length or may be of different lengths on a random basis.

Figure 2:
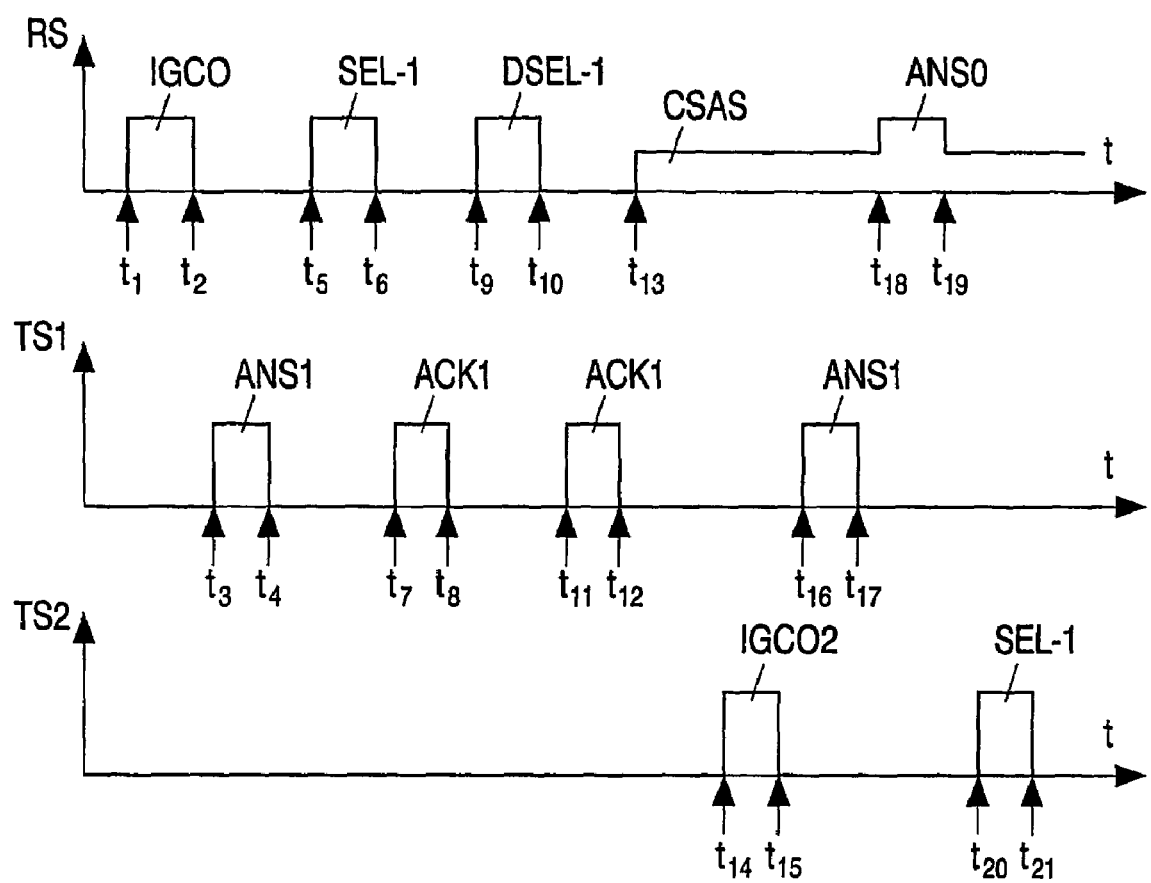
FIG. 2 shows schematically, in the form of a signal-time diagram, commands and signals transmitted between the ID communication partner devices.

A description is given above, on the basis of FIGS. 1 and 2, of what are known as RFID communication partner devices, wherein RFID is the abbreviation for "radio frequency identification". However, the measures according to the invention are not restricted to RFID communication partner devices which communicate with one another in the RF range (RF=radio frequency), but rather they can also advantageously be used in other systems which communicate with one another in the MHz range or GHz range.

The invention claimed is:

1. A method for activating a desired communication mode of an ID communication partner device from a group of possible communication modes, which group comprises at least a first mode and a second mode, wherein the ID communication partner device and at least one other ID communication partner device are brought into a communication connection and wherein a carrier signal is output by the at least one other ID communication partner device, which carrier signal is received by the ID communication partner device, and wherein the carrier signal is repeatedly designated by at least one mode activation signal by the at least one other ID communication partner device, and wherein the absence or the presence of the mode activation signal is recognized by the ID communication partner device, giving a recognition result signal, and wherein, as a function of the recognition result signal, the desired communication mode of the ID communication partner device is activated, the ID communication partner device being always activated to the same mode selected from a Reader Talks First (RTF) mode and a Tag Talks First (TTF) mode when the recognition result signal indicates the absence of the mode activation signal, the ID communication partner device being always activated to the other mode of the RTF mode and the TTF mode when the recognition result signal indicates the presence of the mode activation signal, the ID communication partner device being configured to operate in the RTF mode and the TTF mode.

2. A method as claimed in claim 1, wherein the at least one mode activation signal is formed by at least one sinusoidal signal and the carrier signal is designated by a modulation using the at least one sinusoidal signal.

3. A method as claimed in claim 2, wherein the mode activation signal is recognized by correlation.

4. A method as claimed in claim 2, wherein the mode activation signal is recognized by filtering out the sinusoidal signal.

5. A method as claimed in claim 1, wherein the carrier signal is designated only at predefined time intervals.

6. A method as claimed in claim 1, wherein a recognition of a communication status is carried out and wherein the repeated designation of the carrier signal by the mode activation signal is carried out as a function of the communication status.

7. An integrated circuit for an ID communication partner device designed as a communication station, which integrated circuit comprises the following means:

output means for outputting a carrier signal, which carrier signal can be received by another ID communication partner device, generation means for generating at least one mode activation signal, and designation means for repeatedly designating the carrier signal with the at least one mode activation signal such that the at least one mode activation signal is selectively present, the at least one mode activation signal being configured to be recognized by the another ID communication partner device to always activate the same mode selected from a Reader Talks First (RTF) mode and a Tag Talks First (TTF) mode when the presence of the at least one mode activation signal is recognized, the another ID communication partner being further configured to always activate the other mode of the RTF mode and the TTF mode when the absence of the at least one mode activation signal is recognized, the another ID communication partner device being configured to operate in the RTF mode and the TTF mode.

8. An integrated circuit as claimed in claim 7, wherein the generation means are designed to form the at least one mode activation signal using at least one sinusoidal signal, and wherein the designation means are designed to designate the carrier signal with the at least one sinusoidal signal using modulation.

9. An integrated circuit as claimed in claim 7, wherein the designation means are designed to designate the carrier signal only at predefined time intervals.

10. An integrated circuit as claimed in claim 7,
wherein communication status recognition means are also provided, by means of which a communication status of the ID communication partner device can be recognized, and
wherein the designation means are designed to repeatedly designate the carrier signal by the mode activation signal as a function of the communication status.

11. An ID communication partner device, which is designed as a communication station and which is provided with an integrated circuit as claimed in claim 7.

12. An integrated circuit for an ID communication partner device designed as a data carrier, which integrated circuit comprises the following means: activation means for activating a desired communication mode of the ID communication partner device from a group of possible communication modes, the desired communication mode being either a Reader Talks First (RTF) mode or a Tag Talks First (TTF) mode, the activation means being configured to switch between the RTF mode and the TTF mode,
  storage means for storing mode control data of the group of possible communication modes, which group comprises at least a first mode and a second mode,
  reception means for receiving a carrier signal that is output by another ID communication partner device and is designated with a mode activation signal, and
  recognition means for recognizing the absence or the presence of the at least one mode activation signal, by means of which recognition means a recognition result signal can be generated, as a function of which recognition result signal the activation of the desired communication mode of the ID communication partner device can be activated by the activation means,
  wherein the activation means is configured to always activate the ID communication partner device to the same mode selected from the RTF mode and the TTF mode when the recognition result signal indicates the absence of the at least one mode activation signal, the activation means being further configured to always activate the ID communication partner device to the other mode of the RTF mode and the TTF mode when the recognition result signal indicates the presence of the at least one mode activation signal.

13. An integrated circuit as claimed in claim 12, wherein the recognition means are designed to carry out the recognition of the presence of the at least one mode activation signal by a demodulation using correlation.

14. An integrated circuit as claimed in claim 12, wherein the recognition means are designed to recognize the presence of the at least one mode activation signal by filtering out this signal.

15. An ID communication partner device, which is designed as a data carrier and which is provided with an integrated circuit as claimed in claim 12.

* * * * *